(12) United States Patent
Peon

(10) Patent No.: US 8,978,093 B1
(45) Date of Patent: Mar. 10, 2015

(54) POLICY BASED TRUST OF PROXIES

(75) Inventor: Roberto Peon, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 143 days.

(21) Appl. No.: 13/463,668

(22) Filed: May 3, 2012

(51) Int. Cl.
*G06F 17/00* (2006.01)
*H04L 12/28* (2006.01)

(52) U.S. Cl.
USPC .............................................. 726/1; 370/254

(58) Field of Classification Search
CPC ... H04L 63/20; H04L 63/102; H04L 63/0227; G06F 21/6218; G06F 21/604
USPC ........ 726/1, 25, 4, 9, 10, 11, 15, 17; 709/224, 709/223; 713/164, 201; 370/389; 380/270
See application file for complete search history.

(56) References Cited

U.S. PATENT DOCUMENTS

| | | | |
|---|---|---|---|
| 5,983,350 A | 11/1999 | Minear et al. | |
| 7,603,454 B2 | 10/2009 | Piper | |
| 7,716,722 B2 | 5/2010 | Swift et al. | |
| 8,316,237 B1* | 11/2012 | Felsher et al. | 713/171 |
| 8,582,468 B2* | 11/2013 | Williamson | 370/254 |
| 8,589,541 B2* | 11/2013 | Raleigh et al. | 709/224 |
| 8,606,911 B2* | 12/2013 | Raleigh et al. | 709/224 |
| 8,631,473 B2* | 1/2014 | Bhatia et al. | 726/4 |
| 8,707,421 B2* | 4/2014 | Grzonka | 726/15 |
| 2002/0157019 A1* | 10/2002 | Kadyk et al. | 713/201 |
| 2005/0149726 A1* | 7/2005 | Joshi et al. | 713/164 |
| 2005/0160161 A1* | 7/2005 | Barrett et al. | 709/223 |
| 2007/0016597 A1* | 1/2007 | Beadles et al. | 707/100 |
| 2007/0204153 A1* | 8/2007 | Tome et al. | 713/164 |
| 2008/0282336 A1* | 11/2008 | Diaz Cuellar et al. | 726/11 |
| 2010/0037293 A1 | 2/2010 | StJohns et al. | |
| 2010/0118869 A1* | 5/2010 | Li et al. | 370/389 |
| 2010/0235877 A1* | 9/2010 | Hu et al. | 726/1 |
| 2010/0268771 A1* | 10/2010 | Kulakowski et al. | 709/203 |
| 2010/0322255 A1* | 12/2010 | Hao et al. | 370/398 |
| 2011/0103586 A1* | 5/2011 | Nobre | 380/270 |
| 2011/0119729 A1* | 5/2011 | Bergeson et al. | 726/1 |
| 2011/0235595 A1* | 9/2011 | Mehta et al. | 370/329 |
| 2011/0252230 A1* | 10/2011 | Segre et al. | 713/155 |
| 2011/0258703 A1* | 10/2011 | Ramcharran | 726/25 |
| 2011/0314145 A1* | 12/2011 | Raleigh et al. | 709/224 |
| 2012/0002815 A1* | 1/2012 | Wei et al. | 380/270 |
| 2012/0089727 A1* | 4/2012 | Raleigh et al. | 709/224 |
| 2012/0180135 A1* | 7/2012 | Hodges et al. | 726/26 |
| 2012/0215911 A1* | 8/2012 | Raleigh et al. | 709/224 |
| 2012/0227102 A1* | 9/2012 | Parla et al. | 726/15 |
| 2012/0324091 A9* | 12/2012 | Raleigh et al. | 709/224 |
| 2013/0304616 A1* | 11/2013 | Raleigh et al. | 705/34 |
| 2014/0095706 A1* | 4/2014 | Raleigh et al. | 709/224 |

* cited by examiner

*Primary Examiner* — Abu Sholeman
(74) *Attorney, Agent, or Firm* — Edward A. Gordon; Foley & Lardner LLP

(57) ABSTRACT

A proxy connect component establishes a connection with a proxy, and provides the proxy with a name of a host with which to establish a connection. A negotiation component negotiates a tunnel directly with the host, and a security component classifies the tunnel as at least one of a private-tunnel or a public-tunnel based at least in part on a set of privacy policies. If the tunnel is classified as a public-tunnel, then the proxy is provided a set of security credentials to inspect and/or modify data passing through the tunnel, or a NULL cipher is employed. If the tunnel is classified as a private-tunnel, then the proxy is not provided the security credentials to inspect and/or modify data passing through the tunnel.

14 Claims, 7 Drawing Sheets

POLICY BASED TRUST OF PROXIES

TECHNICAL FIELD

This disclosure generally relates to systems and methods that facilitate policy based trust of proxies.

BACKGROUND

People currently have greater ability to share information, and connect with other people than ever before. In the past, people were largely limited to communicating using wired telephone lines. However, advances in computing and networking technology are continually changing the ways that people interact and exchange information. In addition, the rapid growth of wireless mobile communication devices, enables users to engage in data sharing, voice and/or video communication at virtually any time from anywhere in the world.

Communicating across networks using electronic devices has become nearly ubiquitous. People engage in a wide variety of communications using the internet, ranging from chatting with friends to transmitting sensitive personal and business information. As the world moves to having a greater quantity of communication and commerce transacted via the internet, and in particular, using wireless communications, the necessity to effectively provide secure communications channels is increasing.

A common technique for securing network communications is to employ cryptographic protocols that provide security over the Internet. However, some entities have policies, legal interests, or other important interests in ensuring that only certain content is served through their network or using their hardware. These entities may not allow private communications encrypted using a cryptographic protocol. Consequently, if virtually all communications are encrypted using a cryptographic protocol, then some entities may block virtually all communications.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for policy based trust of proxies are disclosed. A proxy connect component establishes a connection with a proxy, and provides the proxy a name of a host with which to establish a connection. A negotiation component negotiates a tunnel directly with the host, and a security component classifies the tunnel as at least one of a private-tunnel or a public-tunnel based at least in part on a set of privacy policies. If the tunnel is classified as a public-tunnel, then the proxy is provided a set of security credentials to inspect and/or modify data passing through the tunnel, or a NULL cipher is employed. If the tunnel is classified as a private-tunnel, then the proxy is not provided the security credentials to inspect and/or modify data passing through the tunnel.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
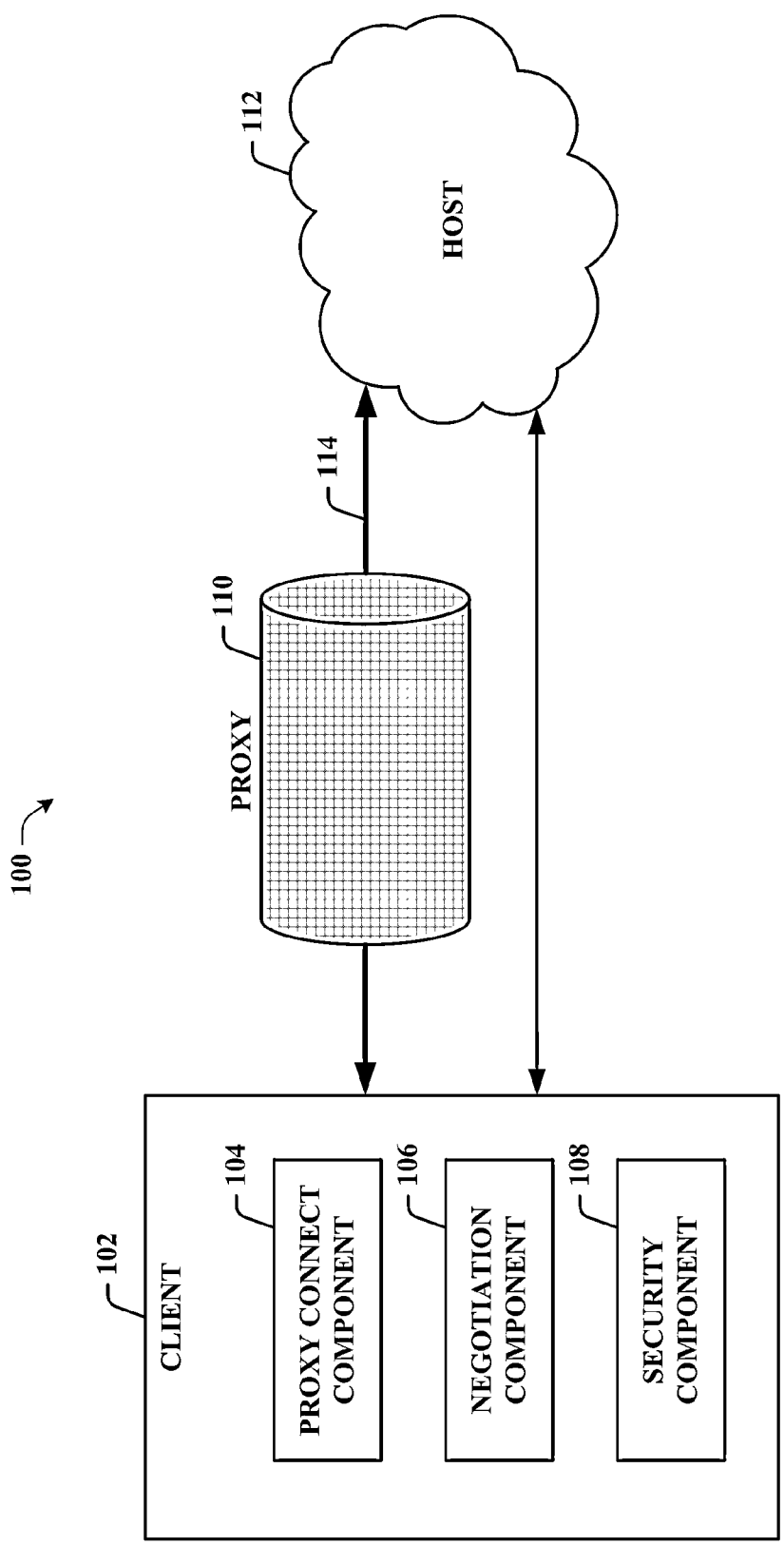
FIG. 1 illustrates an example system for policy based trust of proxies in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

One non-limiting implementation of this disclosure provides for accurate and efficient policy based trust of proxies. More particularly, in accordance with an embodiment, a proxy connect component establishes a connection with a proxy, and provides the proxy a name of a host server with which to establish a connection. A negotiation component negotiates a tunnel directly with the host, and a security component classifies the tunnel as at least one of a private-tunnel or a public-tunnel based at least in part on a set of privacy policies.

Non-Limiting Examples of Systems for Policy Based Trust of Proxies

Turning now to FIG. 1, illustrated is an example system 100 for policy based trust of proxies in accordance with various aspects described in this disclosure. The system 100 includes a client 102. Generally, the client 102 can include a memory that stores computer executable components and a processor that executes computer executable components stored in the memory, examples of which can be found with reference to FIG. 7. The client 102 can include but is not limited to a smart phone, a cell phone, a personal digital assistant (PDA), a tablet, a laptop, a desktop, a portable music player, a video game system, an electronic reader (e-reader), a global positioning system (GPS), a set-top box, and/or a television.

The client 102 includes a proxy connect component 104, a negotiation component 106, and a security component 108. The proxy connect component 104 sets up, organizes, or otherwise establishes a network communications connection with a proxy server 110 (proxy 110). The proxy 110 serves, functions, or otherwise operates as an intermediary for communications between the client 102 and a host server 112 (host 112). For example, in one implementation, the client 102 instructs, provides, or otherwise indicates a name or identity of a host 112 (e.g., internet protocol address, domain name system domain name, etc.) to which the proxy 110 should connect, and the proxy 110 establishes a tunnel 114 to the host 112, such that the client 102 does not pass, send, or otherwise communicate content directly to the host 112.

The host 112 provides services across a network (e.g., The Internet or an intranet) to a set of clients. The host 112 can include but is not limited to a web server, a mail server, a file server, and/or a database server. For instance, the host 112 can include an internet electronic mail (email) server that provides for users to send and receive emails via the internet. The negotiation component 106 establishes or negotiates the tunnel 114 (e.g., a transport layer security context, a secure socket layer context, etc.) with the host 112. For example, in one implementation, the negotiation component 106 and host 112 negotiate the tunnel 114 as if the proxy 110 was not in-line. During the negotiation, the negotiation component 106 and host 112 establish or agree upon a security protocol for private communications. For example, in one implementation, the security protocol includes employing a set of security credentials for private communications. The set of security credentials can include but is not limited to a set of decryption key material (e.g., for a transport layer security context, a secure socket layer context, etc.). Additionally or alternatively, in one implementation, the security protocol includes employing a NULL cipher (e.g., a transport security layer NULL cipher, etc.) for public communications.

The security component 108 implements a set of security policies regarding the proxy 110, host 112 and/or tunnel 114. For example, in one implementation, the security component 108 determines or classifies the tunnel 114 as a public-tunnel or a private-tunnel. For example, in one implementation, if the tunnel 114 is classified as a public-tunnel, then the proxy 110 is provided a set of security credentials for the tunnel 114, and can inspect and/or modify data as it flows in the tunnel 114. For instance, the security component 108 provides the set of security credentials for the tunnel 114 to the proxy 110 before any data, other than negotiation data (e.g., a handshake), passes through the tunnel 114. As an additional or alternative example, in one implementation, if the tunnel 114 is classified as a public-tunnel, then a NULL cipher is employed. Employing the NULL cipher provides for integrity of the data flowing through the tunnel 114 to be maintained and/or verified by the client 102 and/or the host 112, but the data is not encrypted and can be inspected by the proxy 110. If the tunnel 114 is classified as a private-tunnel, then the proxy 110 is not provided the set of security credentials, and/or a non-NULL cipher is employed. The proxy 110 will be is unable to inspect and/or modify data as it flows through the tunnel 114 (discussed in greater detail with reference to FIG. 2).

Figure 2:
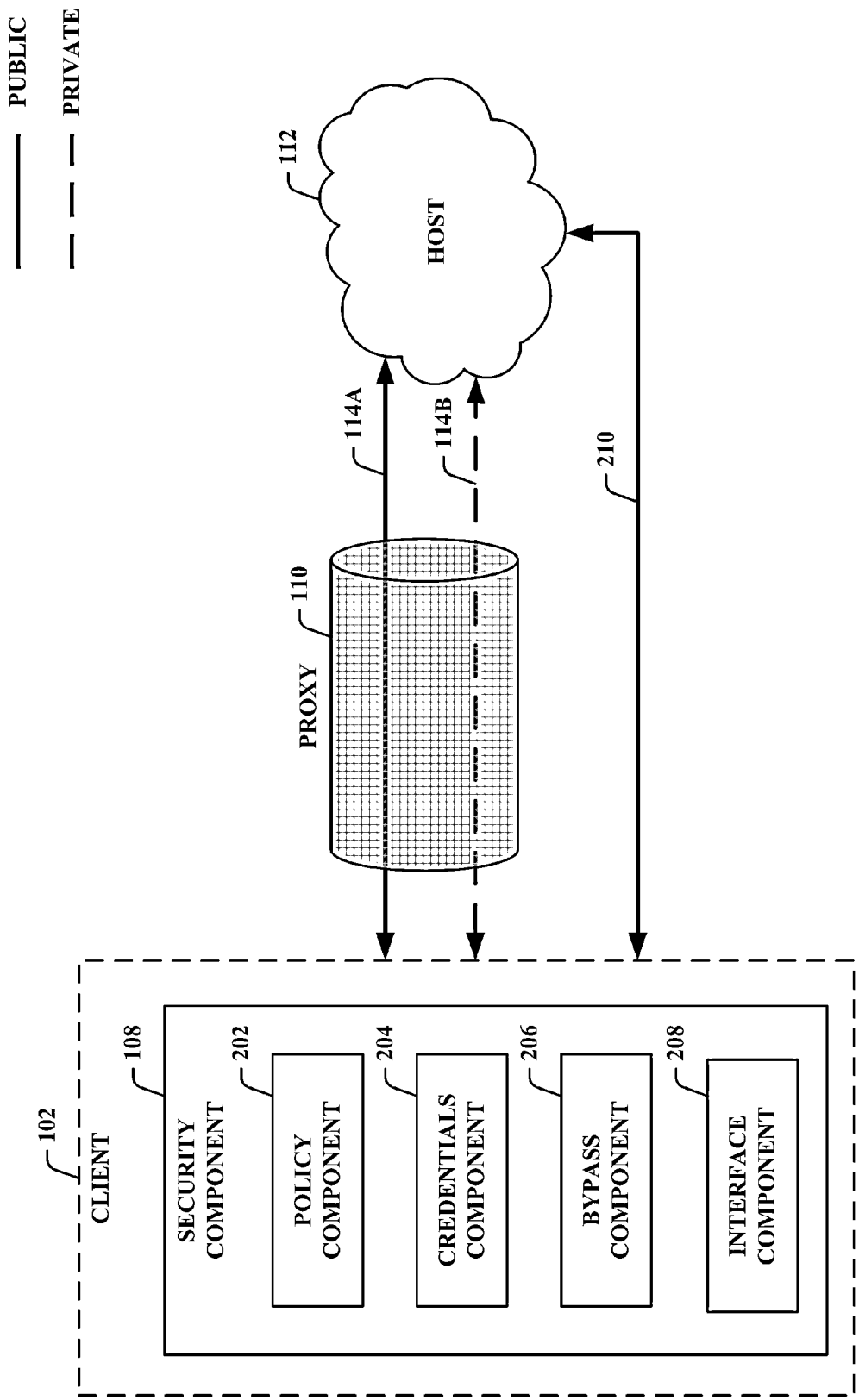
FIG. 2 illustrates an example security component in accordance with various aspects described in this disclosure.

FIG. 2 illustrates an example security component 108 in accordance with various aspects described in this disclosure. As discussed, the security component 108 implements a set of security policies regarding a proxy 110, a host 112 and/or a tunnel (e.g., tunnel 114). The security component 108 in FIG. 2 includes a policy component 202, a credentials component 204, a bypass component 206, and an interface component 208.

The policy component 202 classifies a tunnel (e.g., tunnel 114) as a public-tunnel 114A, or a private-tunnel 114B based in part on a set of security policies. The set of security policies can be provided by a user, the proxy 110, and/or host 112, and/or dynamically determined by the policy component 202. For example, in one implementation, a user explicitly provides policies for classifying a tunnel as a public-tunnel 114A or private-tunnel 114B based in part on the proxy 110, the host 112, and/or a type of traffic (e.g., data) to flow through the tunnel 114. For instance, the user can provide a policy that a first type of data (e.g., email, etc.) is only to flow through private-tunnels.

The credentials component 204 maintains, derives, or otherwise generates the set of security credentials for the tunnel based on the negotiation with the host 112 by the negotiation component 106 (discussed in greater detail with reference to FIG. 1). The set of security credentials can include but are not limited a set of decryption key material. For instance, the credentials component 204 can generate or derive the set of set of security credentials as a function of a pseudorandom algorithm agreed upon during the negotiation. If the tunnel is classified as a public-tunnel 114A, then the proxy 110 is provided the set of security credentials to inspect and/or modify data as it flows through the tunnel 114A. As an additional or alternative example, in one implementation, if the tunnel is classified as a public-tunnel 114A, then a NULL cipher is employed. Employing the NULL cipher provides for integrity of the data flowing through the tunnel 114 to be maintained and/or verified by the client 102 and/or the host 112, but the data is not encrypted and can be inspected by the proxy 110. If the tunnel is classified as a private-tunnel 114B, then the proxy 110 is not provided the set of security credentials, and/or a non-NULL cipher is employed. The client 102 and/or the host 112 can be assured that the content flowing through the proxy 110 has not been modified and/or dropped when the proxy 110 is not provided the set of security credentials or a non-NULL cipher is employed, because the proxy 110 will be unable to inspect and/or modify the content as it flows through the private-tunnel 114B.

The bypass component 206 determines whether the proxy 110 has closed the private-tunnel 114B. If the proxy 110 has closed the private-tunnel 114B, then the bypass component 210 establishes a connection 210 directly to the host 112, and bypasses the proxy 110. For instance, the proxy 110 may be operated by an entity that has a policy requiring inspection of all traffic flowing through the proxy 110. The proxy 110 will be unable to inspect or modify data flowing through the private-tunnel 114B, because the set of security credentials are not provided to the proxy 110 for the private-tunnel 114B. As a consequence, the proxy 110 may not allow the private-tunnel 114B to persist.

The interface component 208 provides various adapters, connectors, channels, communication paths, etc. to integrate the security component 108 into virtually any operating, communications, and/or database system(s). In addition, the interface component 208 can provide various adapters, connectors, channels, communication paths, etc., that provide for interaction with the security component 108. It is to be appreciated that although the interface component 208 is incorporated into the security component 108, such implementation is not so limited. For instance, the interface component 210 can be a stand-alone component to receive and/or transmit data in relation to the security component 108.

It is to be appreciated that the client 102 may be using a multiplexed protocol (e.g., space division multiplexing, frequency division multiplexing, time division multiplexing, statistical time division multiplexing, SPDY™, etc.), and the proxy connect component 104 can establish a virtual connection (stream) using a pre-existing connection. The pre-existing connection may be re-used for both public-tunnels (e.g., public-tunnel 114A) and private-tunnels (e.g., private-tunnel 114B), which will operate on separate streams. In addition, the connection may also be used for signaling messages that are not part of a tunnel. This can enable the proxy 110 to reduce load and/or latency, for example, by performing caching. The data provided in such cases may be trusted, because metadata (e.g., cryptographic hashes) may be supplied over either the public-tunnels and/or private-tunnels, or via another mechanism where the client 102 can verify that the metadata was provided by the host 112 (e.g., a signed piece of data describing cryptographic hashes or merkle-trees over the data the client 102 wishes to receive).

Figure 3:
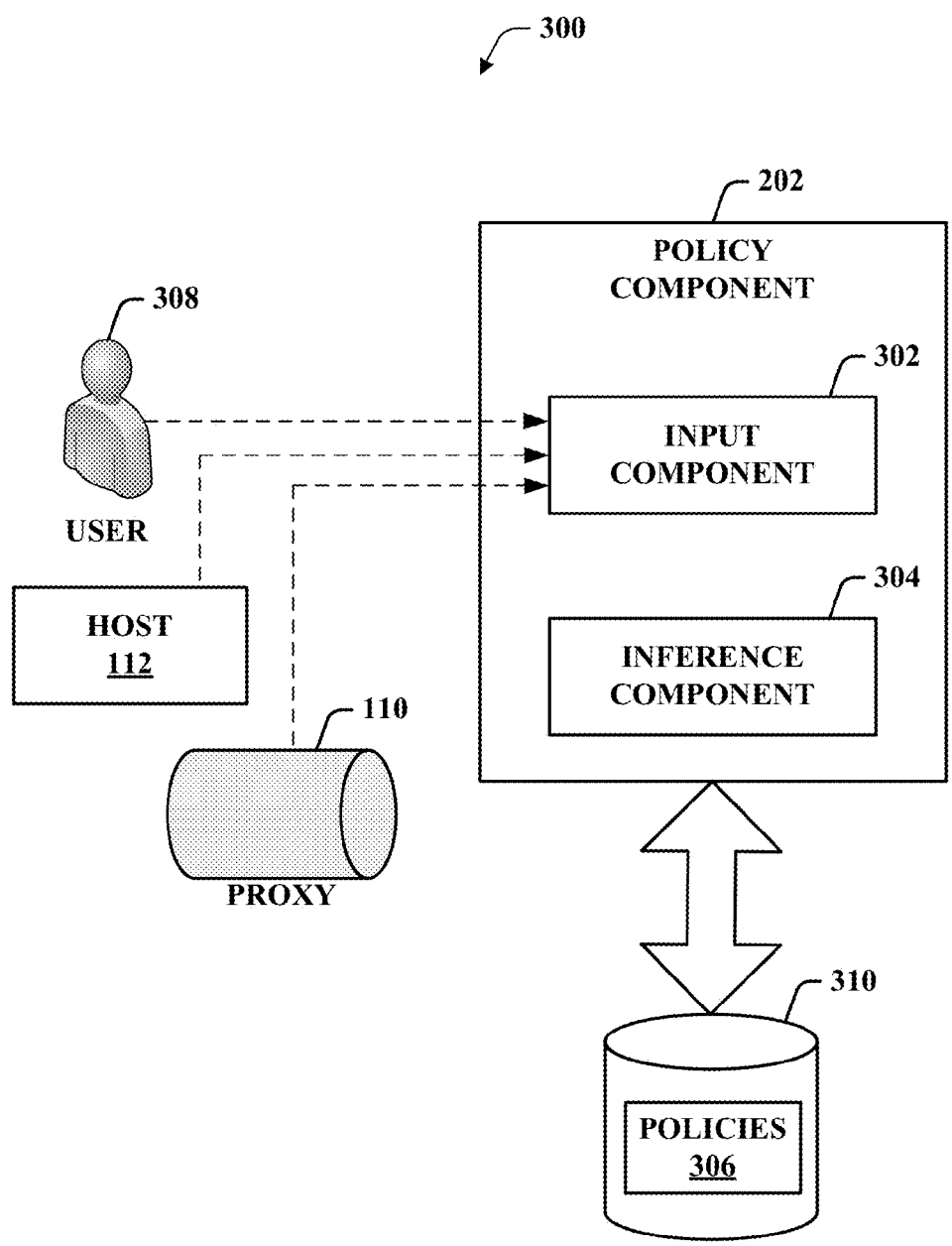
FIG. 3 illustrates an example policy component in accordance with various aspects described in this disclosure.

Referring to FIG. 3, illustrated is an example policy component 202 in accordance with various aspects described in this disclosure. As discussed, the policy component 202 classifies a tunnel (e.g., tunnel 114) as a public-tunnel (e.g., tunnel 114A), or a private-tunnel (e.g., tunnel 114B) based in part on a set of security policies 306. The set of security policies 306 can be provided by a user, a proxy server (e.g., proxy 110), a host server (e.g., host 112), and/or dynamically determined by the policy component 202. The policy component 202 in FIG. 3 includes an input component 302, and inference component 304.

The input component 302 acquires, obtains, or otherwise receives a first subset of the security policies 306 from a user 308, a proxy (e.g., proxy 110), and/or a host (e.g., host 112). For example, in one implementation, the first subset of security policies 306 can include explicit user inputs (e.g., configuration selections, question/answer, etc.) such as from mouse selections, keyboard selections, and/or speech. Additionally or alternatively, in one implementation, the first subset of security policies 306 can include data uploads, wherein a data upload is a transfer of data from the user 308, the proxy 110, the host 112, and/or a third party source (e.g. computer or a computer readable medium), to the input component 302.

The inference component 304 determines or infers a second subset of the security polices based on a set of privacy criteria. The set of privacy criteria can include but is not limited to a type of data to be transmitted (e.g., sensitive, non-sensitive, private, public, etc.), an identity of a proxy, a type of proxy usage (e.g., compulsory, voluntary, etc.), an identity of a host, and/or a type of service provided by a host (e.g., private, public, etc.). For instance, the inference component 304 can classify a first tunnel being used to transmit sensitive data (e.g., passwords, etc.) to a host that provides private services (e.g., online banking) as a private-tunnel.

It is to be appreciated that although the policy component 202 is illustrated in FIG. 2 as being included in the security component 108, such implementation is not so limited. For example, the policy component 202 can be a stand-alone component. Additionally or alternatively, the policy component 202 can be included in a separate location, and the client 102 can access the policy component 202, for example, using a network connection. Furthermore it is to be appreciated that although the policies 306 are illustrated as being maintained in a data store 310, such implementation is not so limited. For example, the policies 306 can be included in the policy component 202, and/or maintained in a different location, wherein the policy component 202 accesses the policies 306 using, for example, a network connection.

Non-Limiting Examples of Methods for Policy Based Trust of Proxies

Figure 4:
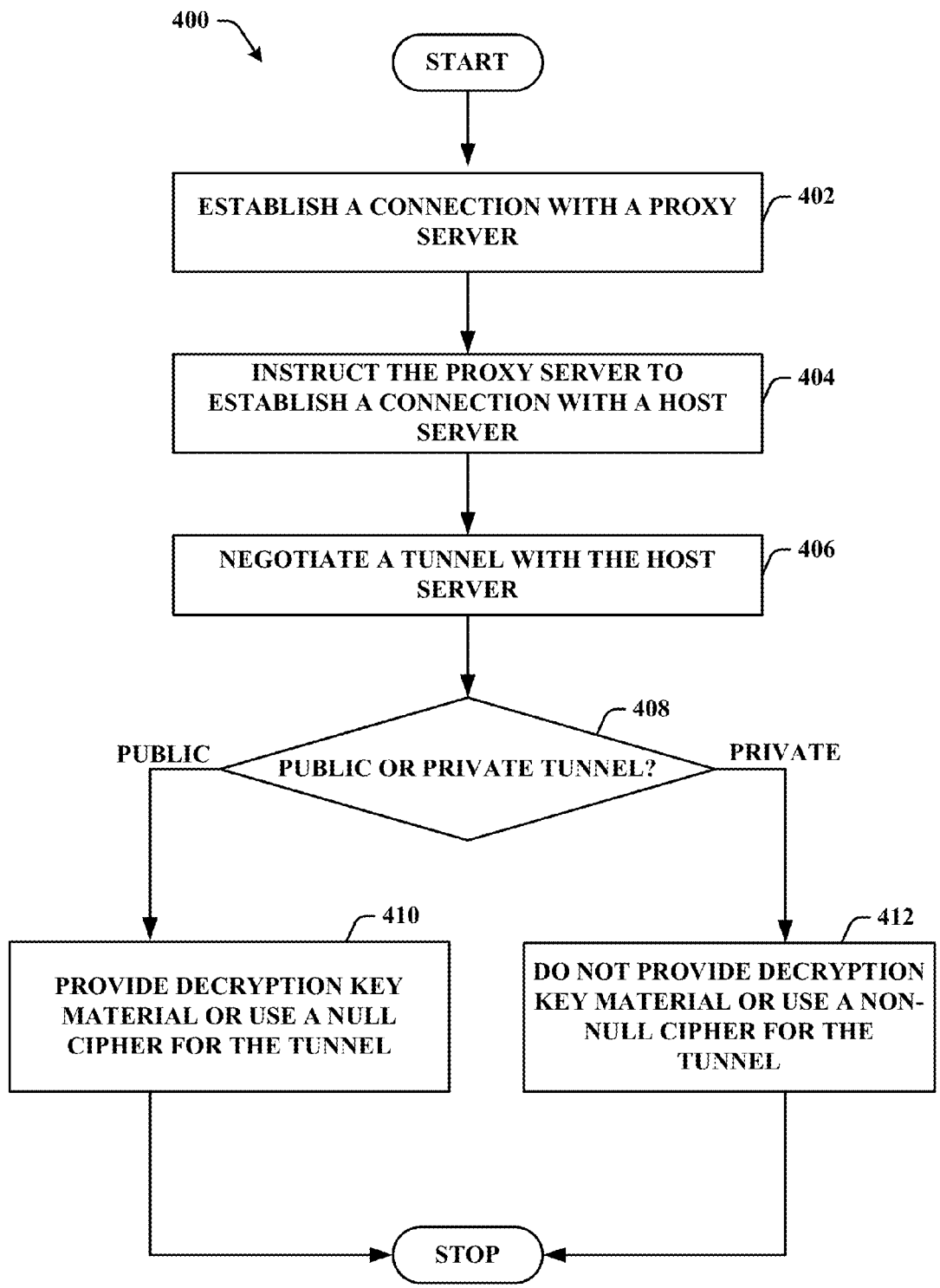
FIGS. 4-5 are example flow diagrams of respective methodologies for policy based trust of proxies in accordance with various aspects described herein.
Figure 5:
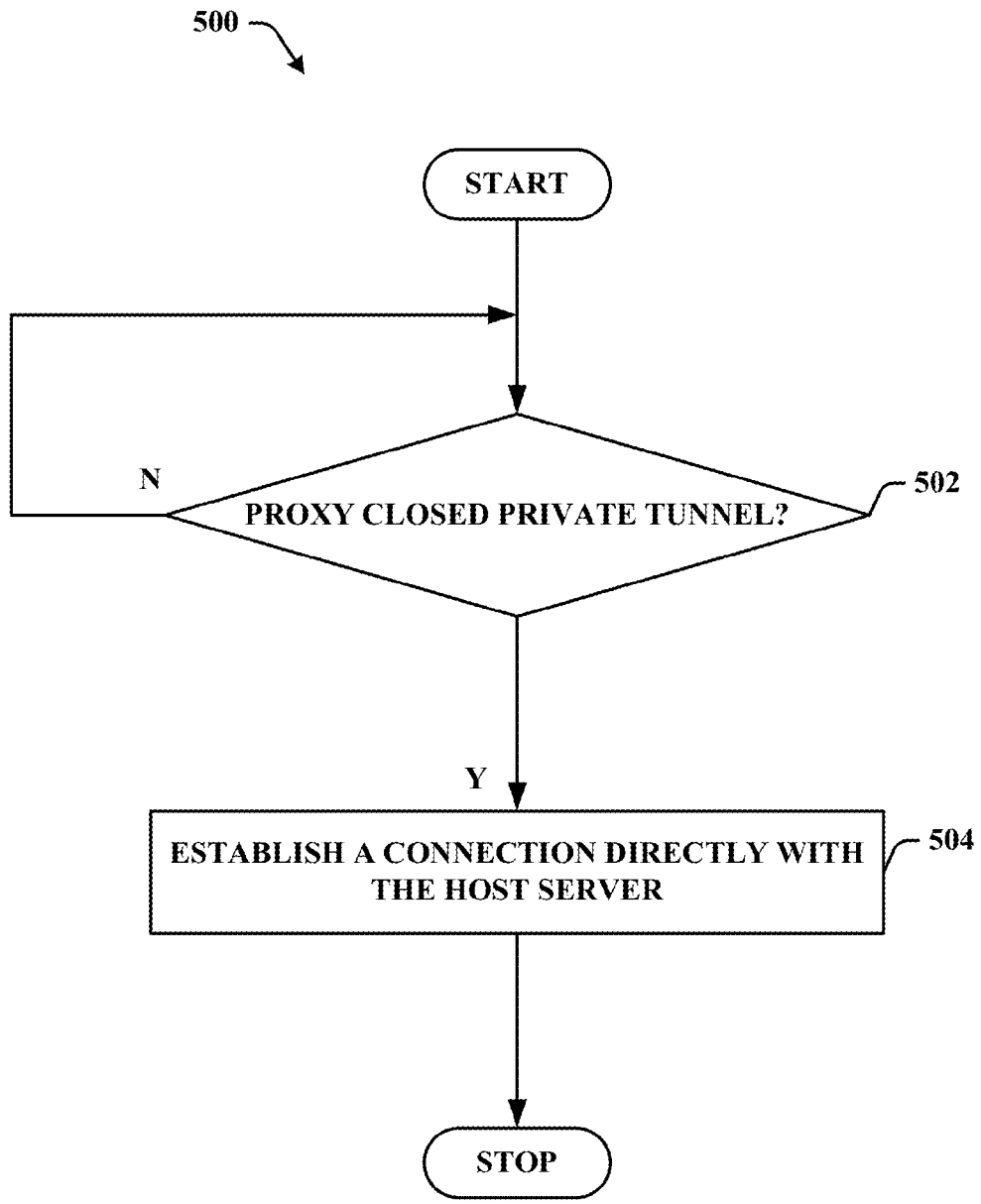

FIGS. 4-5 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 4, illustrated is an example methodology 400 for policy based trust of proxies in accordance with various aspects described in this disclosure. At reference numeral 402, a connection to a proxy server is established (e.g., using the proxy connect component 104). At reference numeral 404, the proxy is instructed to establish a connection with a host server (e.g., using the proxy connect component 104). The proxy operates as an intermediary for communications between a client and a host server. For example, in one implementation, the proxy establishes a tunnel to the host, such that the client does not directly exchange content with the host. The host provides services across a network (e.g., The Internet or an intranet) to a set of clients. For instance, the host can include but is not limited to a web server, a mail server, a file server, and/or a database server.

At reference numeral 406, a tunnel is negotiated with the host server as if the proxy was not in-line (e.g., using the negotiation component 106). During the negotiation, a security protocol for private communications is established or agreed upon. For example, in one implementation, the security protocol includes employing a set of security credentials for private communications. The security credentials can include but are not limited to a set of decryption key material (e.g., for a transport layer security, socket layer security, etc.). Additionally or alternatively, in one implementation, the security protocol includes employing a NULL cipher (e.g., a transport security layer NULL cipher, etc.) for public communications. At reference numeral 408, a determination is made whether to classify the tunnel as a public-tunnel, or a private-tunnel. For example, in one implementation, the tunnel is classified based in part on a set of security policies provided by a user, the proxy, and/or the host. As an additional or alternative example, in one implementation, the set of security policies can be dynamically determined based on a set of privacy criteria (e.g., using the inference component 304). The set of privacy criteria can include but is not limited to a type of data to be transmitted (e.g., sensitive, non-sensitive, private, public, etc.), an identity of a proxy, a type of proxy usage (e.g., compulsory, voluntary, etc.), an identity of a host, and/or a type of service provided by a host (e.g., private, public, etc.).

If it is determined that the tunnel is a public-tunnel (PUBLIC at reference numeral 408), then the set of decryption key material is provided to the proxy at reference numeral 410. The proxy can inspect and/or alter data flowing through the tunnel using the set of decryption key material. As an additional or alternative example, in one implementation, if it is determined that the tunnel is a public-tunnel (PUBLIC at reference numeral 408), then a NULL cipher is employed. Employing the NULL cipher provides for integrity of the data flowing through the tunnel 114 to be maintained and/or verified by the client 102 and/or the host 112, but the data is not encrypted and can be inspected by the proxy. If it is determined that the tunnel is a private-tunnel (PRIVATE at reference numeral 408), then the set of decryption key material is not provided to the proxy at reference numeral 412. The client and/or the host can be assured that data flowing through the proxy has not been modified and/or dropped when the proxy is not provided the set of security credentials, because the proxy is unable to inspect and/or modify the data as it flows through the private-tunnel without the set of decryption key material.

FIG. 5 illustrates an example methodology 500 for policy based trust of proxies in accordance with various aspects described in this disclosure. At reference numeral 502, a determination is made whether the proxy closed a private tunnel (e.g., using the bypass component 206). For instance, the proxy may be operated by entity that has a policy requiring inspection of all traffic flowing through the proxy. The proxy will be unable to inspect or modify data flowing through a private-tunnel, because the security credentials are not provided to the proxy. As a consequence, the proxy may not allow the private-tunnel to persist. If it is determined that the proxy has closed the private-tunnel (Y at reference numeral 502), then a client establishes a direct connection with host server at reference numeral 504 (e.g., using the bypass component 206).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 6:
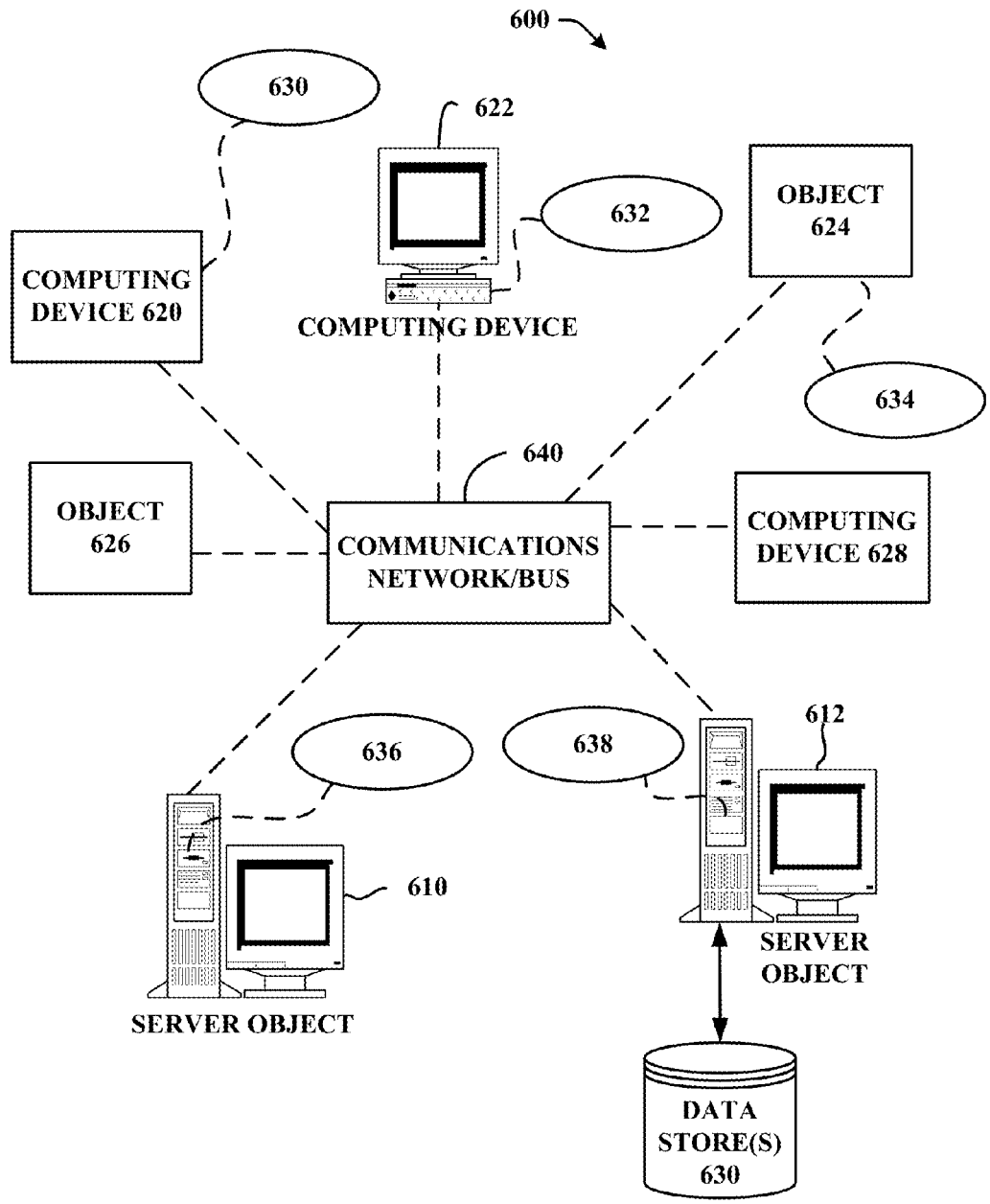
FIG. 6 is a block diagram representing an exemplary non-limiting networked environment in which the various embodiments can be implemented.

FIG. 6 provides a schematic diagram of an exemplary networked or distributed computing environment 600. It is to be appreciated that the distributed computing environment 600 can be used in connection with implementing one or more of the systems or components shown and described in connection with FIGS. 1-3. The distributed computing environment comprises computing objects 610, 612, etc. and computing objects or devices 620, 622, 624, 626, 628, etc., which may include programs, methods, data stores, programmable logic, etc., as represented by applications 630, 632, 634, 636, 638. It can be appreciated that computing objects 610, 612, etc. and computing objects or devices 620, 622, 624, 626, 628, etc. may comprise different networked devices, such as smart phones, cell phones, personal digital assistants (PDAs), tablets, laptops, desktops, portable music players, video game systems, electronic readers (e-readers), global positioning systems (GPS), set-top boxes, televisions, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, network 640 may comprise other computing objects and computing devices that provide services to the system of FIG. 6, and/or may represent multiple interconnected networks, which are not shown. For instance, the network 640 can include a proxy (e.g., proxy 110). Each computing object 610, 612, etc. or computing objects or devices 620, 622, 624, 626, 628, etc. can also contain an application, such as applications 630, 632, 634, 636, 638, that might make use of an API, or other object, software, firmware and/or hardware, suitable for communication with or implementation of the various embodiments of this disclosure. For instance, the applications 630, 632, 634, 636, 638 can include the proxy connect component 104, the negotiation component 106, and/or security component 108.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" (e.g., client 102) is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a networked device that accesses shared network resources provided by another networked device, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc. provide data services, such as receiving data from client computing objects or devices 620, 622, 624, 626, 628, etc., storing of data, processing of data, transmitting data to client computing objects or devices 620, 622, 624, 626, 628, etc., although any networked device can be considered a client, a server, or both, depending on the circumstances.

A server (e.g., host server 112) is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 640 is the Internet, for example, the computing objects 610, 612, etc. can be Web servers with which the client computing objects or devices 620, 622, 624, 626, 628, etc.

communicate via any of a number of known protocols, such as the hypertext transfer protocol (HTTP). Objects 610, 612, etc. may also serve as client computing objects or devices 620, 622, 624, 626, 628, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 7 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 7:
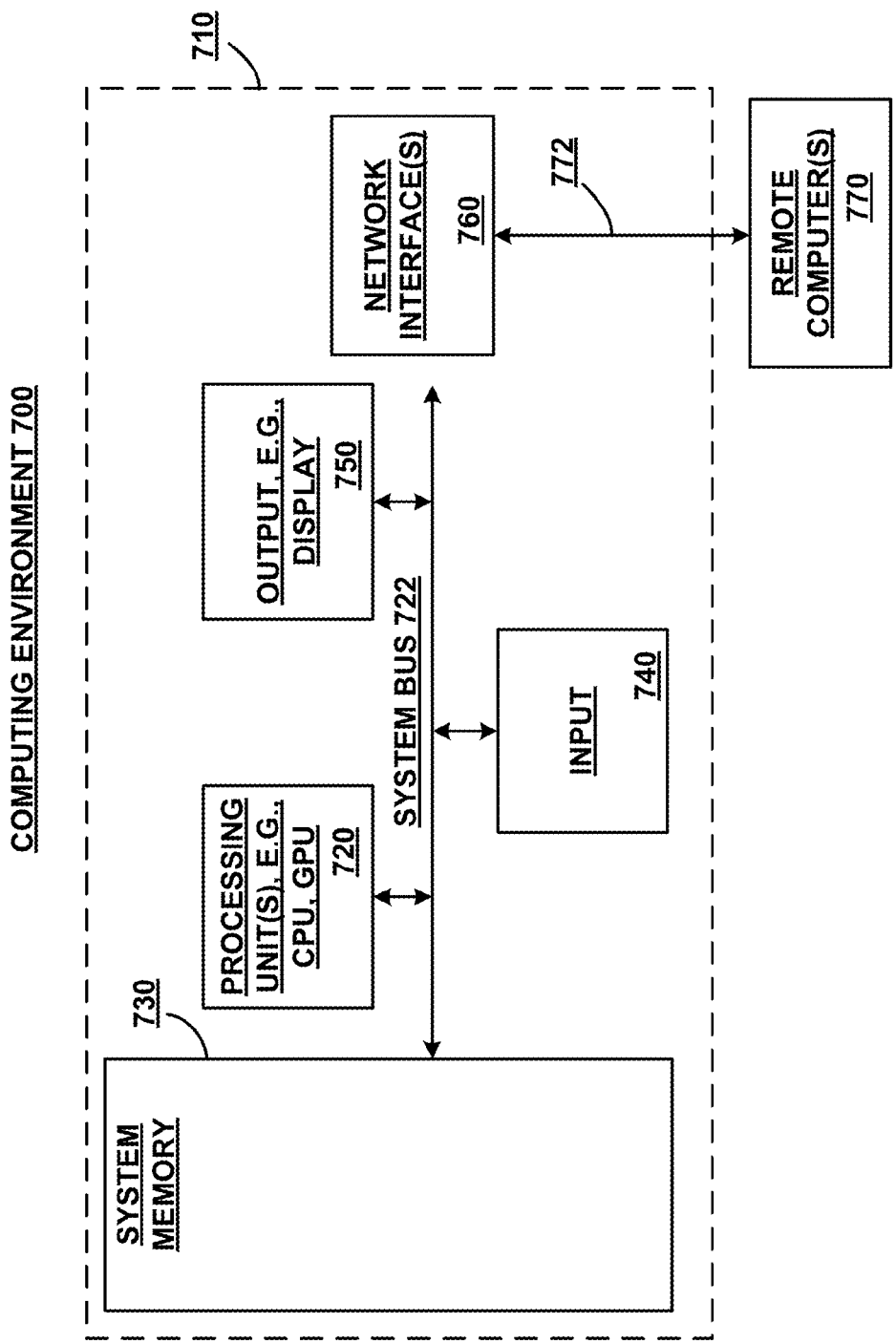
FIG. 7 is a block diagram representing an exemplary non-limiting computing system or operating environment in which the various embodiments may be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. Neither is the computing environment 700 be interpreted as having any dependency or requirement relating to any one or combination of components illustrated in the exemplary operating environment 700.

With reference to FIG. 7, an exemplary remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720. It is to be appreciated that the computer 710 can be used in connection with implementing one or more of the systems or components shown and described in connection with FIGS. 1-3. For instance, the computer 710 can include a client 102, a proxy 110, and/or a host server 112. In addition, the computer 710 can include different networked devices, such as smart phones, cell phones, personal digital assistants (PDAs), tablets, laptops, desktops, portable music players, video game systems, electronic readers (e-readers), global positioning systems (GPS), set-top boxes, televisions, etc.

Computer 710 (e.g., networked device) includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, memory 730 may also include an operating system, application programs, other program modules, and program data.

A user can enter commands and information into the computer 710 through input devices 740 (e.g., using the input component 302). For instance, the user can enter a set of security policies through the input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server (e.g., a host 112), a router, a network PC, a proxy (e.g., a proxy 110), a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media. Computer-readable storage media can be any available storage media that can be accessed by the computer, is typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
    a client comprising:
        a memory storing computer executable components; and
        a processor configured to execute the following computer executable components stored in the memory, the components comprising:
            a proxy connect component that establishes a first connection between the client and a proxy, and provides the proxy with a name of a host with which to establish a second connection;
            a negotiation component that negotiates directly with the host a tunnel between the client and the host through the proxy;
            a security component that classifies the tunnel as at least one of a private-tunnel or a public-tunnel based at least in part on a set of privacy policies;
            a credentials component configured to
                in response to the to the tunnel being classified as a public-tunnel, provide a set of security credentials for the public-tunnel to the proxy or employ a NULL cipher for encryption of communications between the client and the host; and
                in response to the tunnel being classified as a private-tunnel, encrypt communications between the client and the host through the proxy and does not provide a set of security credentials for the private-tunnel to the proxy; and
            a bypass component that in response to the tunnel being classified as a private-tunnel and a determination that the proxy has closed the private-tunnel, bypasses the proxy, and establishes a connection between the client and the host.

2. The system of claim 1, further comprising a policy component that at least one of receives a first subset of the privacy policies from a user or dynamically determines a second subset of the privacy policies.

3. The system of claim 2, wherein the policy component dynamically determines the second subset of privacy policies based in part on at least one of a type of content to be transmitted, an identity of the proxy, a type of proxy usage, an identity of the host, or a type of service provided by the host.

4. The system of claim 1, wherein the proxy connect component establishes a virtual connection with the proxy.

5. The system of claim 4, wherein the proxy connect component establishes the virtual connection with the proxy over a pre-existing connection.

6. The system of claim 5, wherein the virtual connection is employed for messages not associated with the tunnel.

7. A method, comprising:
    establishing a first connection between a client and a proxy;
    providing the proxy with a name of a host with which to establish a second connection between the proxy and the host;
    directly negotiating with the host a tunnel between the client and the host through the proxy;
    classifying the tunnel as at least one of a private-tunnel or a public-tunnel;
    in response to the to the tunnel being classified as a public-tunnel, providing a set of security credentials for the public-tunnel to the proxy or employing a NULL cipher for encryption of communications between the client and the host;

in response to the tunnel being classified as a private-tunnel, encrypting communications between the client and the host through the proxy and not providing a set of security credentials for the private-tunnel to the proxy; and in response to the tunnel being classified as a private-tunnel and a determination that the proxy has closed the private-tunnel, bypassing the proxy, and establishing a connection directly between the client and the host.

8. The method of claim 7, wherein the establishing the first connection with the proxy, includes establishing a virtual connection with the proxy.

9. The method of claim 8, wherein the establishing the virtual connection with the proxy, includes establishing the virtual connection over a pre-existing connection.

10. The method of claim 9, further comprising employing the virtual connection for messages that are not associated with the tunnel.

11. A non-transitory computer-readable medium having instructions stored thereon that, in response to execution, cause a system including a processor to perform operations comprising:

establishing a first connection between a client and a proxy;

providing the proxy with a name of a host with which to establish a second connection;

directly negotiating with the host a tunnel between the client and the host through the proxy;

classifying the tunnel as at least one of a private-tunnel or a public-tunnel;

in response to the to the tunnel being classified as a public-tunnel, providing a set of security credentials for the public-tunnel to the proxy or employing a NULL cipher for encryption of communications between the client and the host;

in response to the tunnel being classified as a private-tunnel, encrypting communications between the client and the host through the proxy and not providing a set of security credentials for the private-tunnel to the proxy; and in response to the tunnel being classified as a private-tunnel and a determination that the proxy has closed the private-tunnel, bypassing, by the system, the proxy, and establishing, by the system, a connection directly between the client and the host.

12. The non-transitory computer-readable medium of claim 11, further comprising receiving at least one of a first subset of the privacy policies from a user or dynamically determines a second subset of the privacy policies.

13. The non-transitory computer-readable medium of claim 11, further comprising determining the second subset of privacy policies based in part on at least one of a type of content to be transmitted, an identity of the proxy, a type of proxy usage, an identity of the host, or a type of service provided by the host.

14. The non-transitory computer-readable medium of claim 11, wherein the establishing the first connection with the proxy, includes establishing a virtual connection with the proxy.

* * * * *